US008640340B2

(12) United States Patent
Foo et al.

(10) Patent No.: US 8,640,340 B2
(45) Date of Patent: Feb. 4, 2014

(54) OFFSHORE WIND TURBINE INSTALLATION

(75) Inventors: Kok Seng Foo, Singapore (SG); Hock Chye Michael Chia, Singapore (SG); Asbjørn Mortensen, Singapore (SG); Cheng Choong Chan, Singapore (SG); Teng Kiat Lim, Singapore (SG); Toh Tung Wong, Singapore (SG); Tom Aksel Waitz Østvold, Singapore (SG); Rune Henriksen, Norway (NO)

(73) Assignees: Keppel Offshore & Marine Technology Centre Pte Ltd, Singapore (SG); Offshore Technology Development Pte Ltd, Singapore (SG); Keppel Fels Ltd, Singapore (SG)

( * ) Notice: Subject to any disclaimer, the term of this patent is extended or adjusted under 35 U.S.C. 154(b) by 885 days.

(21) Appl. No.: 12/759,037

(22) Filed: Apr. 13, 2010

(65) Prior Publication Data

US 2010/0293781 A1   Nov. 25, 2010

Related U.S. Application Data

(60) Provisional application No. 61/180,644, filed on May 22, 2009, provisional application No. 61/220,604, filed on Jun. 26, 2009.

(51) Int. Cl.
*E02D 27/42* (2006.01)
*E04H 12/34* (2006.01)

(52) U.S. Cl.
USPC ........... 29/897.33; 29/429; 29/469; 29/897.3; 52/745.18; 52/651.01; 114/365; 114/259; 254/93 VA

(58) Field of Classification Search
USPC ............... 52/745.17, 745.18, 651.01–651.09; 29/429, 897.3, 897.31, 897.312, 29/897.33, 890.033, 469; 114/365, 259; 254/93 VA See application file for complete search history.

(56) References Cited

U.S. PATENT DOCUMENTS

| 6,614,125 B2 * | 9/2003 | Willis et al. ..................... 290/55 |
| 6,926,097 B1 | 8/2005 | Blake |
| 7,112,010 B1 | 9/2006 | Geiger |

(Continued)

FOREIGN PATENT DOCUMENTS

| DE | 19741988 | 4/1999 |
| EP | 1384883 | 1/2004 |
| WO | 03/093584 | 11/2003 |
| WO | 2004070119 | 8/2004 |

OTHER PUBLICATIONS

Aubrey; "Designer Ships Promise Faster Installation"; Nov. 2001, p. 22.
EP 10 15 9807; European Search Report dated Dec. 1, 2011.

*Primary Examiner* — David Bryant
*Assistant Examiner* — Jason L Vaughan
(74) *Attorney, Agent, or Firm* — Renner, Otto, Boisselle & Sklar, LLP

(57) ABSTRACT

Installation vessels and methods for offshore wind turbine installation are disclosed. In one embodiment, a cantilever mast is used to transfer of wind turbine components from an installation vessel to an offshore installation site and guide the transfer to prevent undesired swinging movements of the wind turbine components. In another embodiment, a main crane is used in cooperation with a guide arm to transfer and guide wind turbine components from an installation vessel to an offshore installation site.

5 Claims, 14 Drawing Sheets

(56) References Cited

U.S. PATENT DOCUMENTS

| | | | |
|---|---|---|---|
| 7,234,409 B2 * | 6/2007 | Hansen | 114/258 |
| 7,877,933 B2 * | 2/2011 | Watchorn | 52/40 |
| 8,016,519 B2 * | 9/2011 | Bingham et al. | 405/209 |
| 8,235,231 B2 * | 8/2012 | Schneider et al. | 212/308 |
| 8,313,266 B2 * | 11/2012 | Numajiri | 405/204 |
| 8,316,614 B2 * | 11/2012 | Soe-Jensen | 52/745.17 |
| 2004/0042876 A1 * | 3/2004 | Seegers et al. | 414/137.7 |
| 2004/0151549 A1 | 8/2004 | Roodenburg et al. | |
| 2008/0237173 A1 | 10/2008 | Altman et al. | |
| 2009/0028647 A1 | 1/2009 | Bingham et al. | |
| 2010/0067989 A1 * | 3/2010 | Brown et al. | 405/196 |
| 2012/0131876 A1 * | 5/2012 | Nies | 52/651.01 |
| 2012/0219364 A1 * | 8/2012 | Li et al. | 405/209 |
| 2012/0255478 A1 * | 10/2012 | Hadeler et al. | 114/61.31 |
| 2012/0266796 A1 * | 10/2012 | Roodenburg et al. | 114/61.14 |

* cited by examiner

OFFSHORE WIND TURBINE INSTALLATION

The present application is related to and claims benefit under 35 U.S.C. §119(e) to U.S. Provisional Application No. 61/180,644, filed 22 May 2009, and to U.S. Provisional Application No. 61/220,604, filed 26 Jun. 2009, both of which are entitled METHOD AND SYSTEM FOR WINDMILL INSTALLATION AT AN OFFSHORE LOCATION, the entirety of each of which is incorporated herein by reference.

TECHNICAL FIELD

Embodiments of the invention relate to various methods and installation vessels for wind turbine installation at offshore locations.

BACKGROUND

Various methods have been employed for offshore installation of wind turbines.

U.S. 2009/0028647 A1 discloses a method and apparatus for the mounting of offshore structures in deeper waters and suitably for mounting tall structures or relatively small width, such as a wind turbine generator. The wind turbine generator comprises a tower, a nacelle housing components and a rotor with blades. The wind turbine generator can be fully assembled on shore in its upright configuration by a tower supporting apparatus, lifted onto a transporting vessel and transferred to its final installation position using two large cranes. One limitation of this method is the use of multiple large cranes which increases costs. These large floating cranes are more suitable for calm weather operation and are subject to the environmental conditions (i.e. waves, current, etc) which will adversely affect the available window of installation.

U.S. Pat. No. 7,112,010 B1 discloses a system and method for up-righting a wind turbine assembly at an offshore installation location. Two up-righting towers along with at least one pulling string on an up-righting barge are used to assist in up-righting at least part of the wind turbine assembly. The wind turbine assembly includes a pillar, rotor and nacelle. One limitation of this method is the need for two up-righting towers to erect the windmill, which may be cumbersome and increases costs.

EP 1,581,703 A1 discloses a method of installation of wind turbines in which a nacelle and rotors are pre-assembled with a top tower section to form a pre-assembled nacelle tower at the harbour. The pre-assembled nacelle tower, a middle tower section and a lower tower section are subsequently transferred to a barge using a Turbine Roll & Lift (TRL) system. The TRL system allows for serial operation and several turbines may be loaded on the barge for a single trip from the harbour to the installation sites. The lower tower section, the middle tower section and the pre-assembled nacelle tower are separately disposed on the barge. At the installation site, the barge is docked to the foundation of the installation site. The TRL lifts a pre-assembled nacelle tower and positions it approximately above the foundation. A middle tower section is introduced under the pre-assembled nacelle tower and coupled thereto. The pre-assembled nacelle tower and the middle tower section are lifted to a greater height before a lower tower section is introduced under the middle tower section and coupled thereto. This near-completed wind turbine, which couples the nacelle tower, the middle tower section and the lower tower, is lowered into the foundation at the installation site to complete the entire installation. One limitation of this method is that the number of turbines that can be loaded onto the barge is dependent on the available jack-up vessel capacity and size of the turbines.

SUMMARY

Installation vessels and methods for offshore wind turbine installation are disclosed in which transfer of wind turbine components from installation vessels are guided to prevent undesirable swinging induced by wind conditions. Accordingly, safer installation at reduced time may be achieved for increasing operational efficiency.

In an installation vessel for offshore installation of wind turbines, the installation vessel may comprise a deck and a cantilever mast mounted on the deck. The cantilever mast may include a cantilever structure movably mounted on the deck and a mast fixedly or movably mounted on the cantilever structure. A lifting device may be provided on the mast to provide load lifting through at least part of the mast height. The lifting device may actuate, i.e. raise or lower, a lifting structure which is operable to secure to a wind turbine component or load during a lifting operation. A guide, e.g. a travelling block dolly, is operable to movably engage the lifting structure to the mast during a lifting operation and thereby preventing swinging of the wind turbine component being lifted. To this purpose, guide rails may be provided along the mast to define a path for the dolly, and accordingly the lifting structure with the wind turbine component. Once a wind turbine component or load is lifted by the mast, the cantilever mast is operable to transfer the wind turbine component between an installation vessel and an offshore installation site spaced apart from the installation vessel by moving the cantilever mast in a longitudinal direction and/or a transverse direction.

Using the above installation vessel, various methods for offshore installation of wind turbines, using different assembly sequence of wind turbine components, may be envisaged.

In another installation vessel for offshore installation of wind turbines, the installation vessel may comprise a deck, a main crane mounted on the deck, an assembly platform elevated from the deck, a guide arm adjustable in at least three directions being a longitudinal direction, a transverse direction and a vertical direction (e.g. x, y and z directions). The guide arm is operable to cooperate with the main crane to guide a first wind turbine component during transfer between the installation vessel and an offshore installation site to prevent swinging of the first wind turbine component. The main crane is operable to transfer a second wind turbine component between the installation vessel and a trolley movably mounted on the first wind turbine component, the trolley being operable to install the second wind turbine component onto the first wind turbine component.

Using the above installation vessel, various methods for offshore installation of wind turbines, using different assembly sequence of wind turbine components, may be envisaged.

BRIEF DESCRIPTION OF THE DRAWINGS

Embodiments of the invention will be readily understood by the following detailed description in conjunction with the accompanying drawings.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described.

Figure 1:
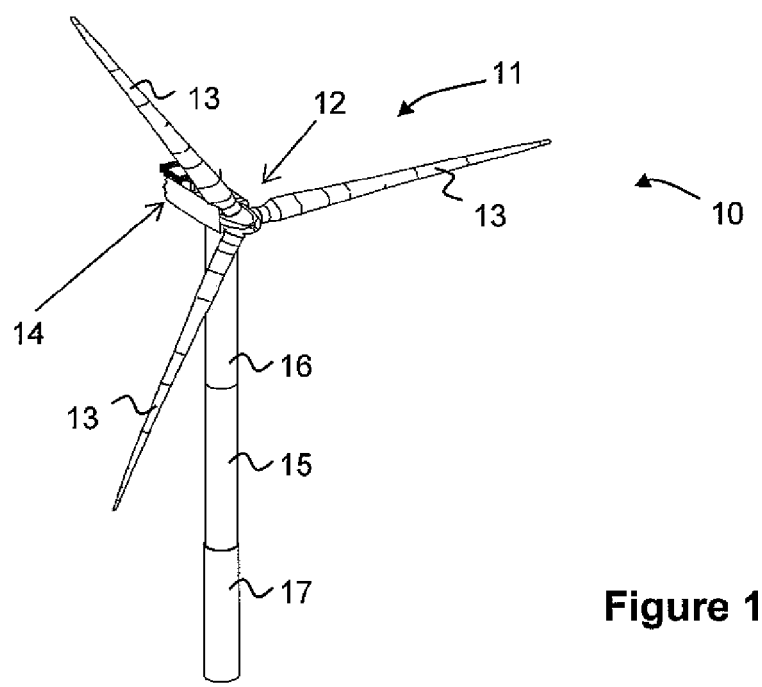
FIG. 1 shows a wind turbine.

FIG. 1 shows an offshore wind turbine 10 which may comprise the following components: (1) rotor 11 (formed of a center hub 12 and generally three blades 13 or other suitable number of blades installed to the hub 12) which may span approximately 80 m to 140 m in diameter); (2) a nacelle 14 (formed of a main bearing, gearbox and electrical generator) which may weigh up to 500 tonnes; (3) tower sections 15, 16 (or at least one tower section) to support the rotor 11 and nacelle 14 at a suitable height, e.g. 100 m above sea level; (4) a foundation 17 secured to the seabed to support the tower sections 15, 16 above water. Examples of foundation type include, but are not limited to mono-pile, gravity foundation, tripod foundation, ballast stabilised, mooring line stabilised, and buoyancy stabilised. These wind turbine components may be interfaced to each other by cylindrical flanges and bolted together.

Figure 3A:
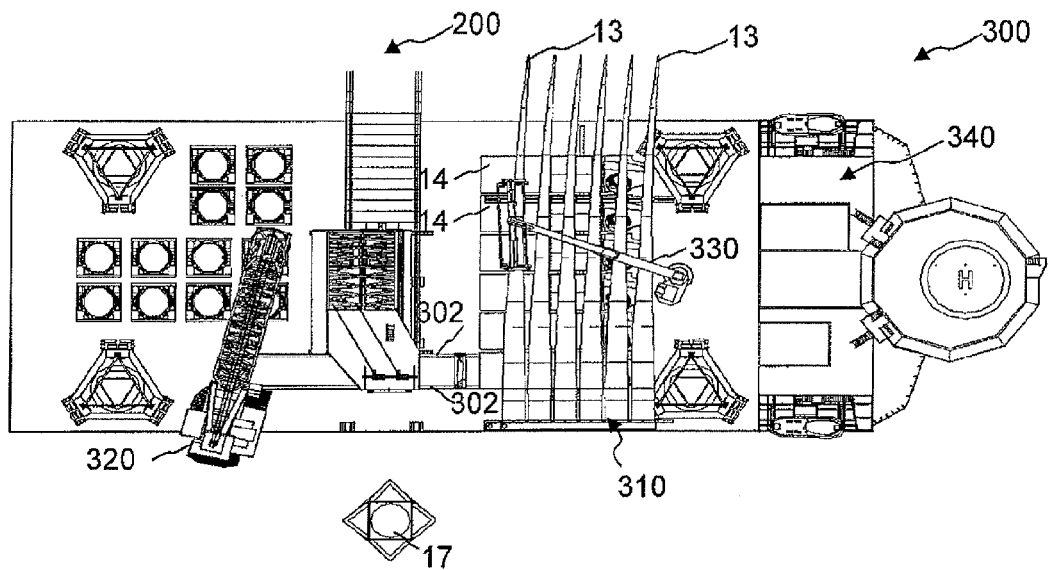
FIG. 3A is a top view of a system for offshore wind turbine installation according to one embodiment of the invention.
Figure 3B:
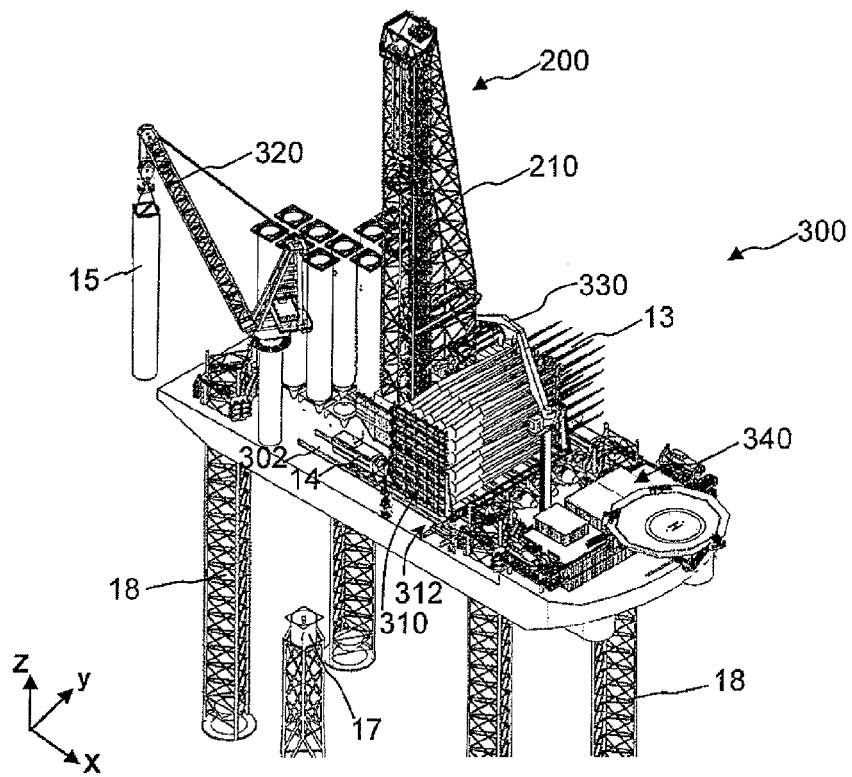
FIGS. 3B to 3E show a method for wind turbine installation at an offshore installation site according to one embodiment of the invention.

Reference is made to FIG. 3A (top view) and FIG. 3B (isometric view) which show an installation vessel for offshore wind turbine installation according to one embodiment of the invention. The installation vessel 300 (or barge or a floating platform) may be self-propelled and provided with multiple jack-up legs 18 for securing the installation vessel 300 to a seabed to reduce relative movement, which may be caused by wave and/or wind conditions, between the installation vessel 300 and a foundation 17 at an offshore installation site which may be spaced apart from the installation vessel 300 over a water body.

Figure 2A:
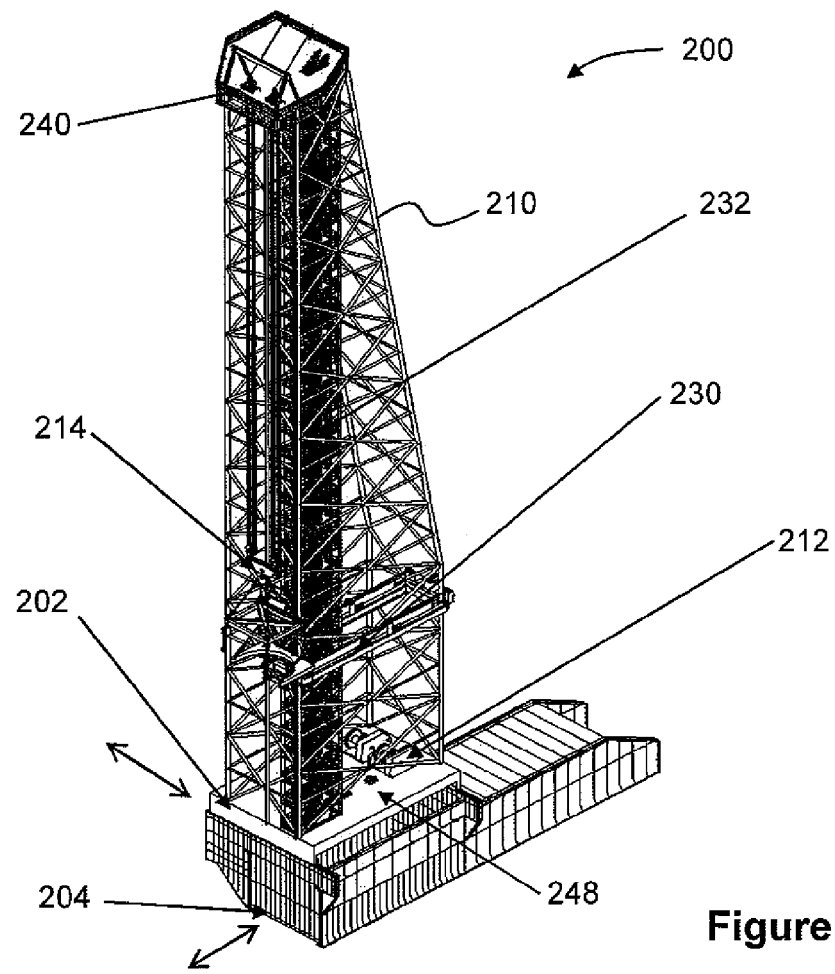
FIG. 2A shows a cantilever mast.

The installation vessel 300 may also provide a cantilever mast 200 (FIG. 2A) which is operable to skid or move over a deck of the installation vessel, and even outside the installation vessel towards a pre-installed foundation 17 in the sea, e.g., about 15 m from a deck of the installation vessel. The cantilever mast 200 may be formed of a mast 210 movably or fixedly mounted on a cantilever structure. In one embodiment illustrated by FIG. 2A, the cantilever mast 200 may be implemented by movably mounting at least two cantilever platforms on a deck of an installation vessel. A mast 210 may be mounted on a first cantilever platform 202 which is movably mounted on a second cantilever platform 204 which in turn is movably mounted on the deck. The first cantilever platform 202, e.g. longitudinal skidding platform, is movable or skidable in a first direction over the second cantilever platform 204, i.e., longitudinal direction. The second cantilever platform 204, e.g. transverse skidding platform, is movable or skidable in a second direction over the deck which is transverse to the first direction, i.e., transverse direction. By moving the cantilever platforms 202, 204 in the longitudinal and/or transverse direction, the mast 210, together with a lifted load, may be moved to a desired position over the deck and even over the sea beyond the deck. It is to be appreciated that the cantilever platforms 202, 204 may be movable relative to each other or the deck by one of various methods including, but not limited to, skidding, sliding and rolling.

In certain other embodiments, the mast 210 may be movably mounted on a cantilever platform which is movably mounted on the deck. The mast 210 may be movable or skidable in a first direction over the cantilever platform, e.g. longitudinal direction (or x direction), and the cantilever platform may be movable or skidable in a second direction over the deck, e.g. transverse direction (or y direction), which is transverse to the first direction. While other arrangements may be envisaged, it is to be appreciated that a cantilever mast 200 employed in the invention would allow the mast 210 to be moved in at least two directions, i.e. longitudinal and transverse directions, over a deck of an installation vessel.

The mast 210 may have a height suitably dimensioned in view of the anticipated height of the wind turbine to be installed. For example, the mast 210 may have a vertical height of up to about 100 m to handle larger-sized wind turbines. The mast 210 includes a main lifting device which comprises a plurality of main winches 212 mounted on the first cantilever platform 202 for easy access and maintenance, and arranged inside the mast 210. The main lifting device of the mast 210 may be used to lift wind turbine components to a desired height above the vessel deck to facilitate installation of the wind turbine components on a wind turbine foundation 17 at an installation site, or to facilitate subassembly work at an intermediate level of the mast 210. The main lifting device may include a sheave system with wire-ropes located at the top portion of the mast 210 (see FIG. 2B), and at least one travelling block 214 and a lifting structure 216 (see FIG. 2C). The mast 210 may include auxiliary lifting devices which comprise a plurality of auxiliary winches 248 for handling or lifting other accessories in the wind turbine installation operation.

Figure 2B:
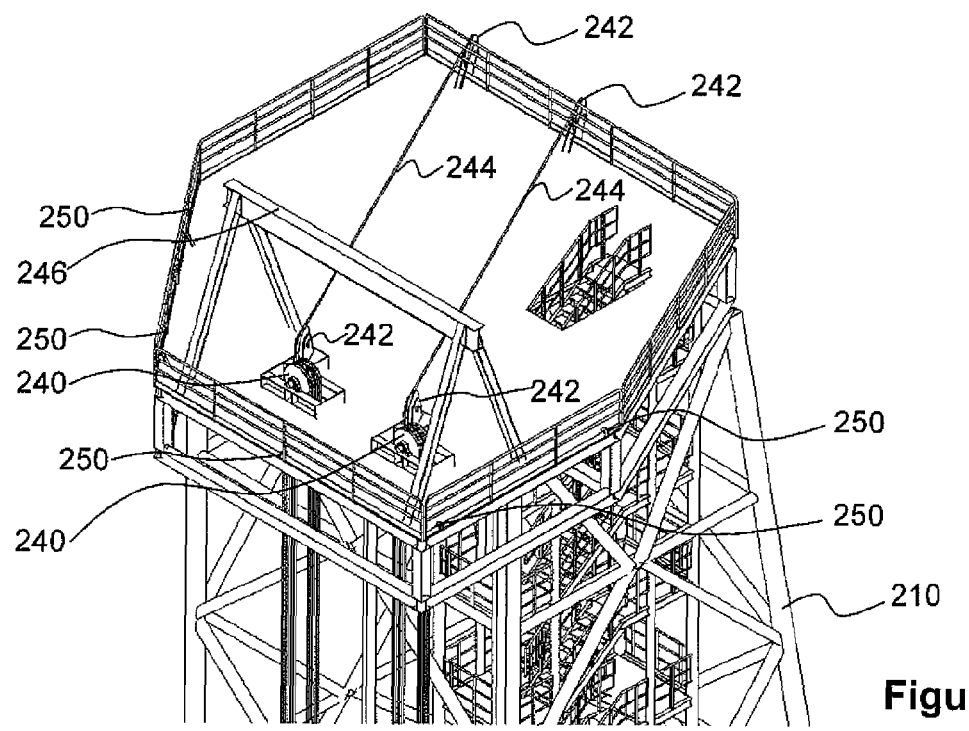
FIG. 2B shows a top portion of the cantilever mast of FIG. 2A.

Reference is made to FIG. 2B which shows a top portion of the mast 210 having crown blocks 240 (e.g. two crown blocks) configured to cooperate with diverter sheaves 242 (e.g. four diverter sheaves). Particularly, each crown block 240 may cooperate with a fast line sheave diverting a wire rope or line 244 to a guide sheave at the edge of the mast 210. A gin-pole 246 may be installed above the crown block 240 so that the diverter sheaves 242 or other parts of the crown block 240 can be removed easily with a temporary hoisting winch which is mounted on the gin-pole 246. Auxiliary sheaves 250 may also be provided at the edge of the mast 210 to cooperate with the auxiliary winches 248 described above.

Figure 2C:
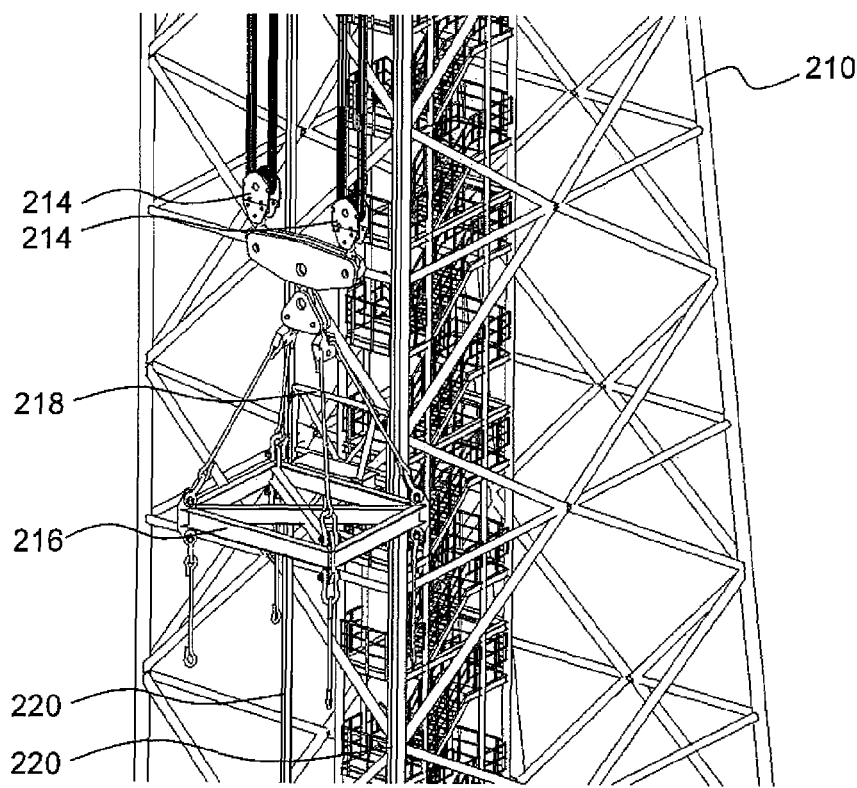
FIG. 2C shows the cantilever mast of FIG. 2A having a mast, travelling blocks, a lifting device and a travelling block dolly.

Reference is made to FIG. 2C which shows travelling block(s) 214 cooperate with the sheave system and wire-ropes to provide lifting operation. Particularly, the travelling blocks 214 are actuable by the main winches 212 to move along the mast height. The travelling blocks 214 support a lifting structure 216 (e.g. a frame or other suitably-shaped structure) which is operable to secure to a load during the lifting operation. The mast 210 may include a travelling block dolly 218 secured to the lifting structure 216 for guiding the lifting path of a load, in a vertical direction, to prevent the load from rotating or swinging during lifting operation. To this purpose, guide rails 220 may be mounted along the mast 210 to provide a secured path for the travelling block dolly 218. The travelling block dolly 218 may be movably mounted along the guide rails 220. As the travelling block dolly 218 is attached to the lifting structure 216, the lifting structure 216 and a wind turbine component or load secured thereto are accordingly movably engaged to the guide rails 220 of the mast 210, thereby preventing the wind turbine component being lifted from undesirable swinging movements induced by wind conditions.

Figure 2D:
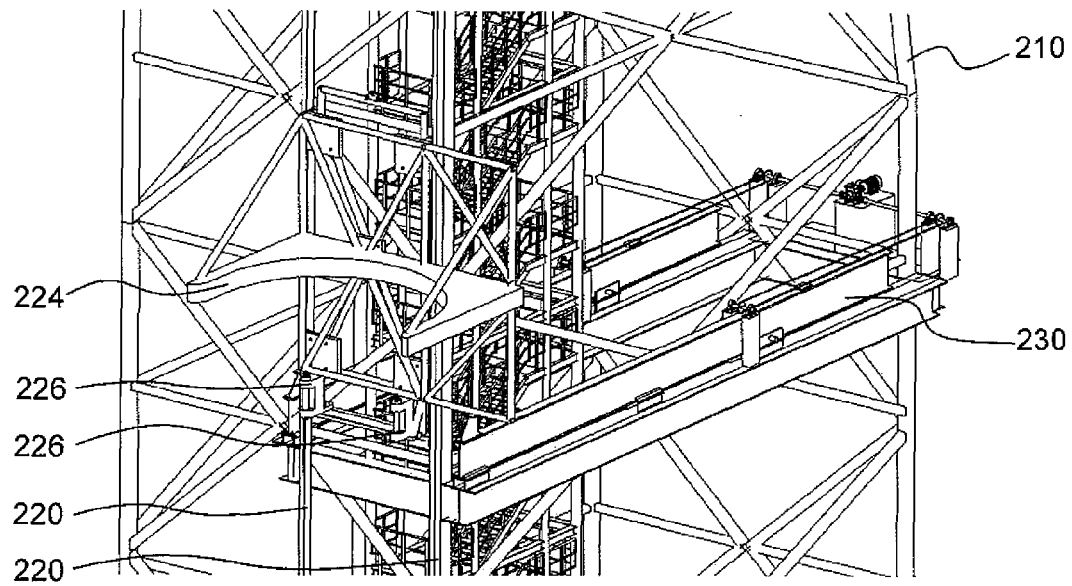
FIG. 2D shows a guide frame removably attached to a power dolly.

An additional dolly, e.g. power dolly 222, may be provided to move other loads to and from the installation vessel. The power dolly 222 may also be used to guide a wind turbine component, e.g. tower section, which is transferred from the installation vessel to the offshore installation site by the cantilever mast 200. To this purpose, a guide frame 224, e.g. a C-shaped frame (FIG. 2D) may be removably attached to the power dolly 222. The guide frame 224 is operable to engage the wind turbine component to prevent it from swinging. In certain embodiments, e.g. FIGS. 3A to 3E, after blade installation to a hub is completed, the power dolly 222 may be used to move a nacelle skid base (which supported a nacelle and hub assembly during transfer from the nacelle storage area 312) from the intermediate platform 230 to the deck and nacelle storage area 312. For this purpose, the power dolly 222 may include pivots to detachably engage with padeyes 226 of the nacelle skid base.

Figure 2E:
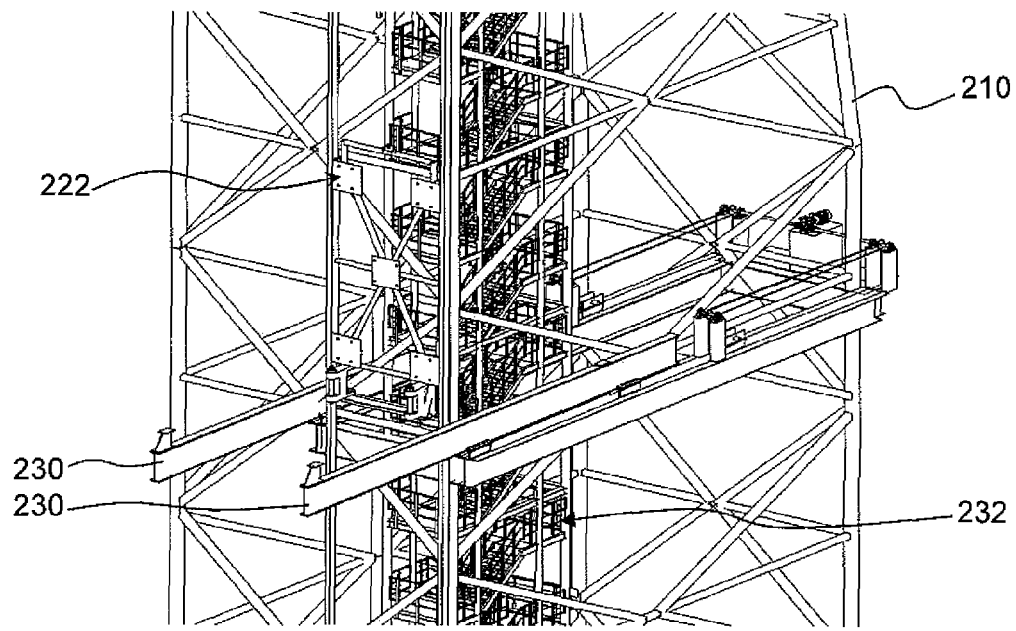
FIG. 2E shows an intermediate platform in an extended position.

At an intermediate level of the mast 210, the mast 210 includes a movable intermediate platform 230, e.g. a two-fork structure, to provide a lower height working area, such as for installing blades to a nacelle, for safer operation (FIG. 2E). Stoppers may be provided on the ends of the two-forks structure to retain a load supported thereon. The intermediate platform 230 may be elevated from the deck and adjustable between at least a retracted position (in which the intermediate platform 230 may be relatively flush with or housed within the mast 210) and an extended position (in which the intermediate platform 230 forms a horizontal projection relative to the mast 210 to provide a horizontal support on which a nacelle or other components may be disposed and supported thereon). In the present disclosure, the intermediate platform 230 may be movable between the retracted and extended positions by one of various methods including, but not limited to, skidding, sliding, rolling and pivoting movements.

The mast 210 may further provide a stairway 232 (or ladder or a combination thereof) to allow access to various components of the mast 210 for maintenance Reference is now made to FIGS. 3A and 3B. Blades 13 for wind turbine rotors may be stored on a blade magazine 310 in a matrix arrangement e.g. five blades high and six blades wide with its sharp end up. The blades 13 are supported from two ends, by a root end cradle bolted to the root flange, and a cavity in the tip end fitting the blade geometry. The cradles are secured to each other by an ISO container locking system, thus making it easy to remove the cradles. The blade orientation makes it easy to lower a blade gripper from above and strap wide belts around the blade, which workers can access from a cherry picker. These gripper belts may have an automatic release system.

Nacelles 14 may be stored under the blade magazine 310. The nacelles 14 may be pre-assembled with hubs 12 or stored separately from the hubs 12. A nacelle skidding system, including skidding rails 302, may be provided on the deck to transfer the nacelles 14 from the storage area under the blades 13 to a pick-up location in front of the mast 210 to be lifted, and vice versa.

Various other cranes may be provided on the deck of the installation vessel. For example, a main crane 320, e.g. 500-tonne, 800-tonne, 1200-tonne crane, may be provided to handle tower sections of wind turbine and possibly other components. One or more blade handling crane 330, e.g. knuckle boom crane, lattice boom type blade handling crane, in cooperation with taglines, may be provided to transfer blades 13 from the blade magazine 310 and then install the blades into a hub of a pre-assembled nacelle and hub assembly disposed at the intermediate platform 230. Installing blades into the hub at the intermediate platform 230 which is at a low working height results in smaller wind load which in turn increases operational efficiency. Other auxiliary cranes may be provided as required.

The installation vessel 300 may further provide various designated areas, such as but not limited to, living quarters 340 on the deck for the accommodation of personnel, locations for third party equipment, e.g. ROV, piling hammers, cable lay modules, and underdeck common utility equipment, e.g. hydraulic unit, workshops.

FIGS. 3A and 3B show an arrangement on an installation vessel 300, including but not limited to, a storage for tower sections, a main crane 320, cantilever mast 200, a blade magazine 310, a nacelle storage area 312 under the blade magazine 310, a blade handling crane 330, and living quarters for personnel.

A method for installing a wind turbine at an offshore installation site under calm weather (e.g. wind speed about 12 m/s or less), according to one embodiment of the invention, will now be described with reference to FIGS. 3B to 3E, in which the main crane 320 and cantilever mast 200 are used in parallel operations. The method includes providing or disposing multiple tower sections in a designated area, blades on a blade magazine 310, nacelles pre-assembled with hubs under the blade magazine 310 on a deck of an installation vessel 300. After the installation vessel 300 is jacked-up proximate to an offshore installation site, a main crane 320 lifts and transfers a lower tower section 15 from the installation vessel 300 to a foundation 17 at the installation site (FIG. 3B). An upper tower section 16 may subsequently be lifted and transferred onto the lower tower section 15 by the main crane 320 in a similar manner.

Figure 3C:
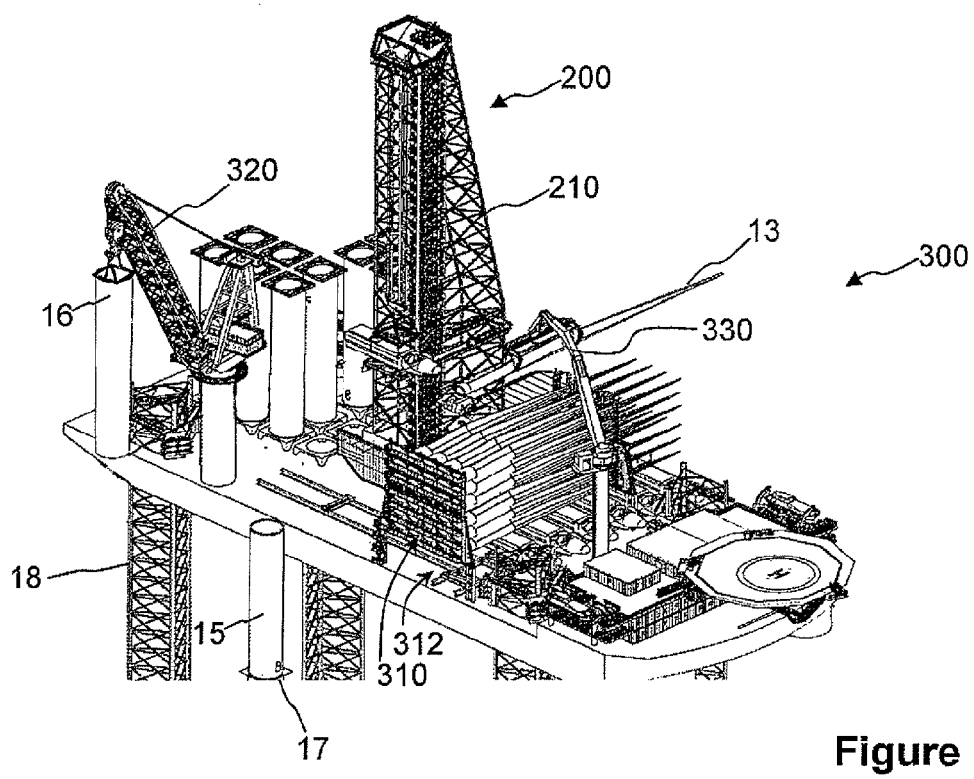
Figure 3D:
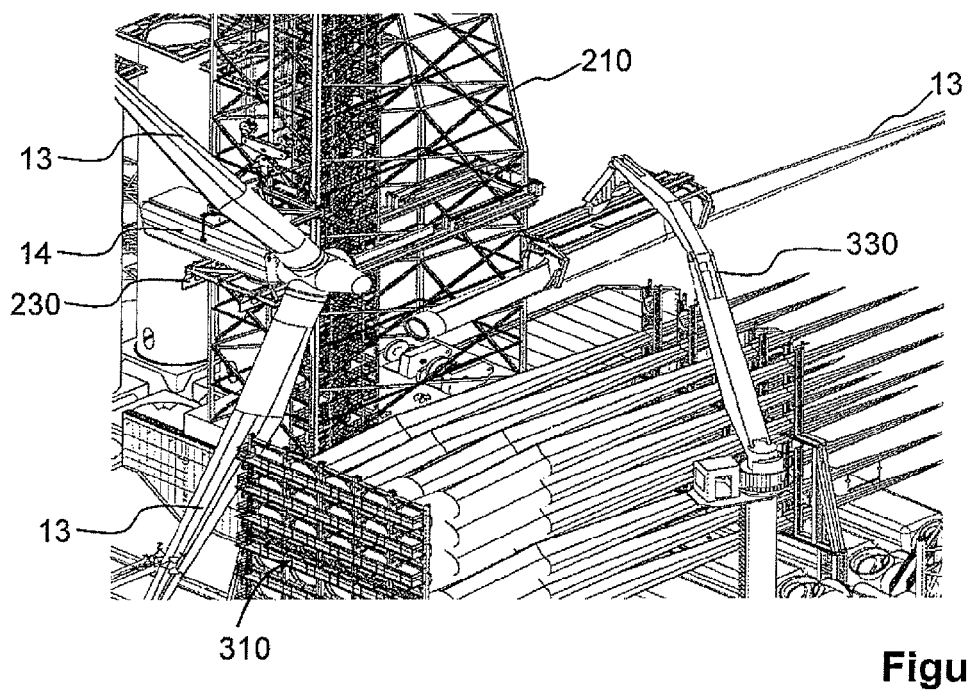

At the same time, the method proceeds to retrieve or skid out a nacelle 14 with a pre-assembled hub 12 from the nacelle storage area 312 and transfers the nacelle 14 to a pick-up position in front of the mast 210. During lifting of the nacelle 14, the lifting structure 216 of the mast 210 is secured to the nacelle 14 with the pre-assembled hub while a travelling block dolly 218 connected to the lifting structure 216 prevents the nacelle 14 from swinging during the lifting. The nacelle 14 is lifted above the intermediate platform 230 which moves into an extended position, and thereafter supported on the intermediate platform 230 for blade installation. A blade handling crane 330 may pick up a first blade and connect the first blade to the hub 12 (FIG. 3C). After a first blade is installed, the hub is rotated about 120 degrees to allow installation of a second blade, and thereafter the hub is further rotated about 120 degrees to allow installation of a third blade (FIG. 3D) to form a nacelle and rotor assembly. During blade installation, the nacelle may be secured in place by wire ropes and tightened by winches.

Figure 3E:
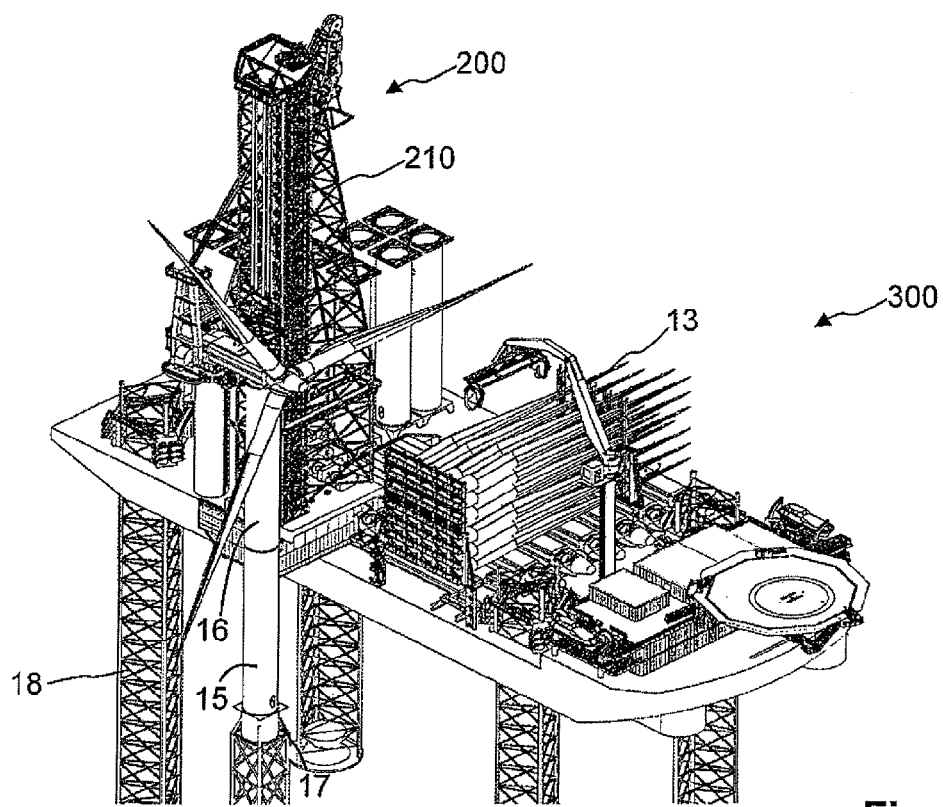

The nacelle and rotor assembly is lifted by the mast 210 to a desired height, and the cantilever mast 200 is skidded out or moved in a longitudinal and/or transverse direction over the deck to deliver the nacelle and rotor assembly close to the offshore installation site. Further fine tuning to the cantilever mast 200 in the longitudinal and/or transverse direction may be required to install the nacelle and rotor assembly to the upper tower section 16 installed at the foundation 17 as shown in FIG. 3E.

The above method may be suitably modified for windy weather conditions (e.g. wind speed between about 12 m/s to about 20 m/s). Instead of using a main crane 320 to transfer the tower sections from the installation vessel to the foundation 17 at the installation site, the main crane 320 lifts and transfers each of a lower and an upper tower section to a pick up position in front of the mast 210. The mast 210 lifts the lower/upper tower section and transfers the lower/upper tower to the foundation 17 at the offshore installation site by skidding or moving the cantilever mast 200 in the longitudinal and/or transverse direction over the deck. To prevent undesired swinging and/or tilting movements of the towers caused by wind and/or wave conditions, a C-shaped frame or other suitably-shaped frame may be attached to a power dolly 222 located along the mast 210 to engage a portion of the tower section while the cantilever platforms are skidded or moved to deliver the tower section to the foundation 17. Also, a belt may be provided to secure the tower to the C-shaped frame for added stability. Further, stability of the tower section being lifted may be maintained by using pull winches and sheaves (pulleys) provided at the mast 210. After the tower sections are installed, blade installation on the intermediate platform 230 and transfer of the nacelle and rotor assembly to the offshore installation site may be performed as described above.

While FIGS. 3B to 3E illustrate a wind turbine being formed of two tower sections 15,16, it is to be appreciated that a wind turbine may be formed of only one tower section or, in certain embodiments, two or more tower sections stored either separately or in a pre-assembled form.

Certain wind turbines do not allow the rotor to turn during assembly, and are unable to carry and rotate only one blade. Therefore, sequential blade installation as in the foregoing sequence may not be performed. This may be due to potentially huge imbalance in the rotor during partial installation of blades. Hence, FIGS. 4A to 4D show another method for installing a wind turbine at an offshore installation site according to another embodiment of the invention where rotors are pre-assembled and delivered by a feeder vessel 410 (e.g. barge or jack-up vessel) to the installation site.

Figure 4A:
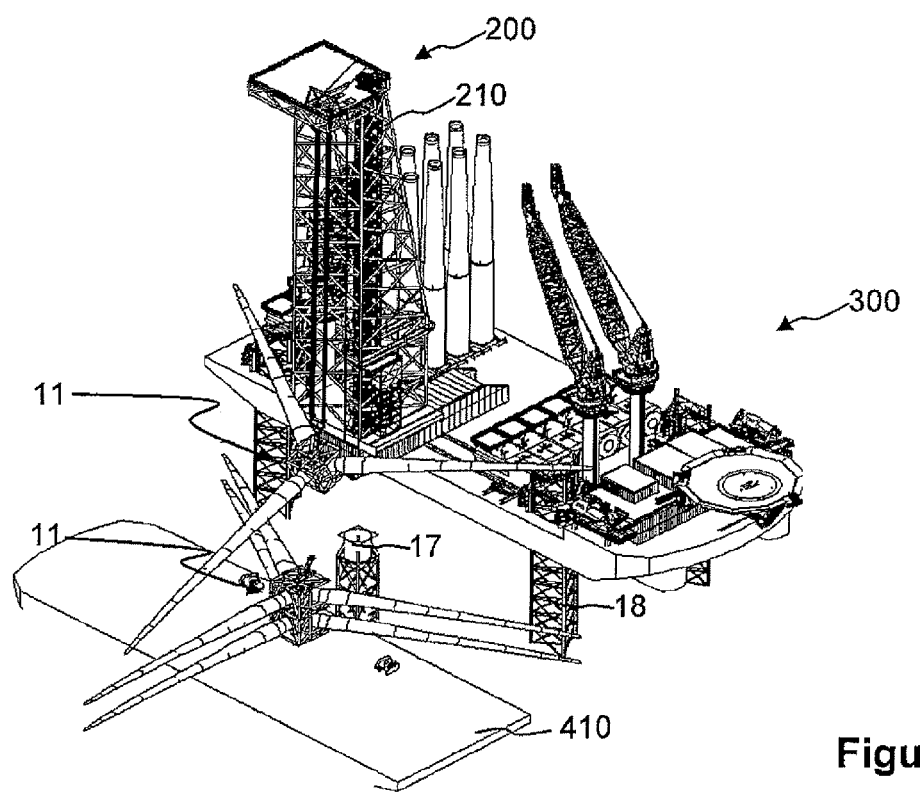
FIGS. 4A to 4D show a method for wind turbine installation at an offshore installation site according to one embodiment of the invention.
Figure 4B:
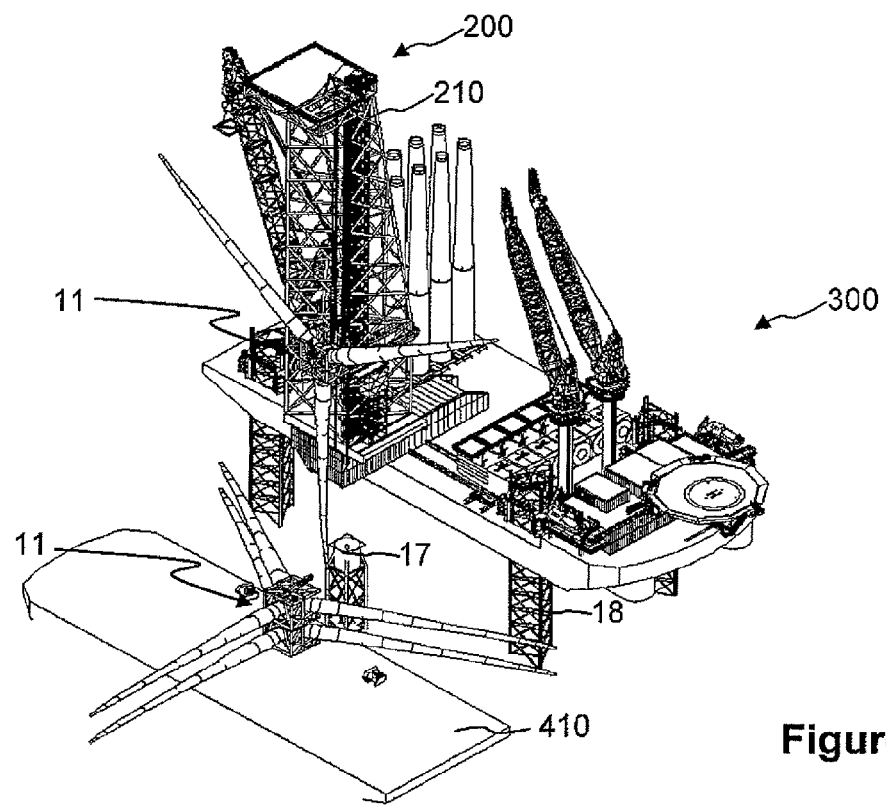
Figure 4C:
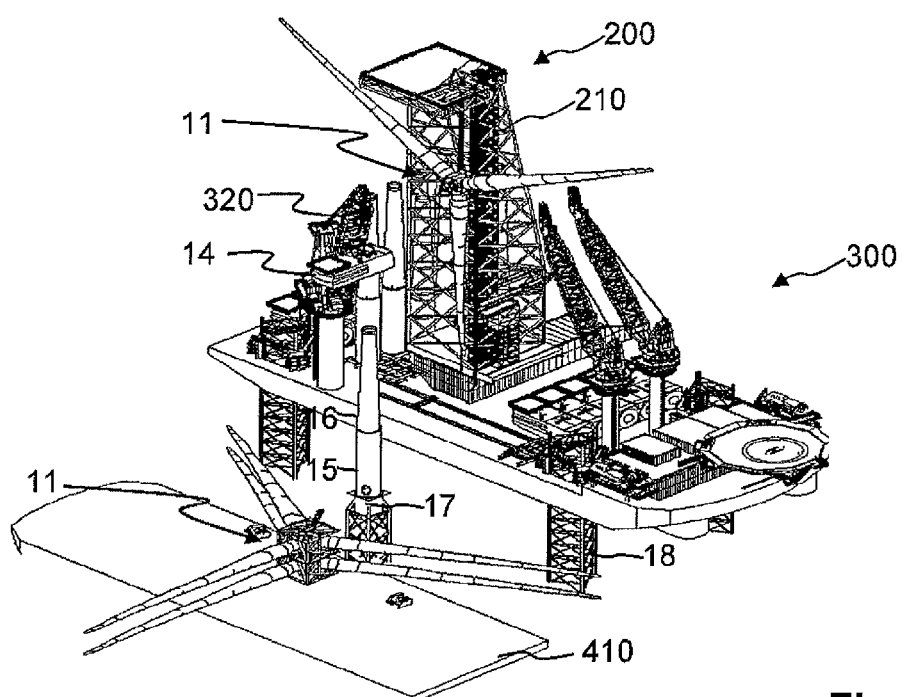
Figure 4D:
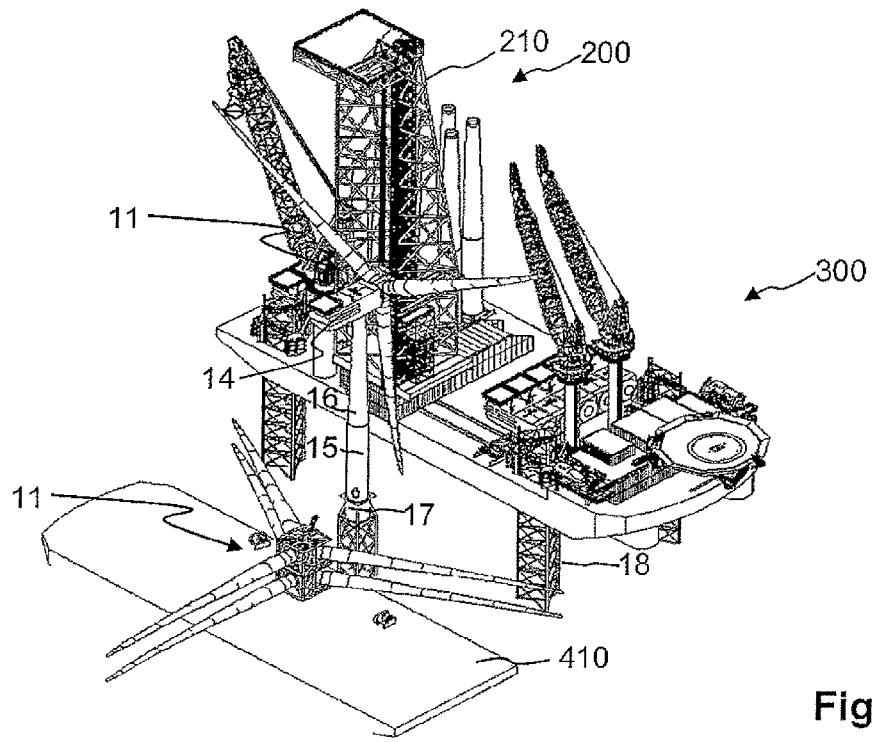

FIG. 4A shows a feeder vessel 410 transporting pre-assembled rotors 11 arranged in a horizontal orientation. The feeder vessel 410 is positioned proximate to an installation vessel 300 which may have similar configuration as in FIGS. 3A and 3B. However, since the rotors 11 are pre-assembled and delivered separately, the installation vessel may not need to store hubs and blades. FIG. 4A shows a pre-assembled rotor 11 being lifted by the mast 210 and rotated into a vertical orientation with the cooperation of rotor rotational tools and tag lines (at the deck or from the mast 200) which draw the rotor 11 towards the mast 210. To this purpose, the cantilever mast 200 may be skidded or moved in the longitudinal and/or transverse direction towards the feeder vessel to pick up the rotor 11. The intermediate platform 230 of the mast 210 may be extended to support the rotor 11 while a transportation fixture on the rotor 11 is removed (FIG. 4B). The lower and upper tower sections of a wind turbine may then be installed at the foundation 17 by use of the main crane 320. Subsequently, a nacelle may be installed to the installed tower sections using the main crane 320 (FIG. 4C). The rotor 11 may then be transferred onto the installed nacelle using the cantilever mast 200. To this purpose, the mast 210 may lift the rotor 11 and the cantilever mast 200 skid or move in the longitudinal and/or transverse direction to deliver the rotor 11 towards the nacelle 14. Further fine tuning of the cantilever mast 200 in the longitudinal and/or transverse direction may be required to deliver and install the rotor 11 to the nacelle 14 as shown in FIG. 4D.

For certain wind turbines, it may not be possible to lift a pre-assembled nacelle, hub and blades at the same time due to improper location of lifting points inside the nacelle and hub. This may be due to the high load in the "nose" of the wind turbine which creates a potential imbalance, hence it is necessary to also lift the hub. However, the hub and the nacelle are connected via a bearing, making it improper to perform a combined lift. Further, it is expected that gearless, direct drive slow speed generators will be lighter in weight in comparison to the hub and blades which creates more potential imbalance for such combined lift.

Figure 5A:
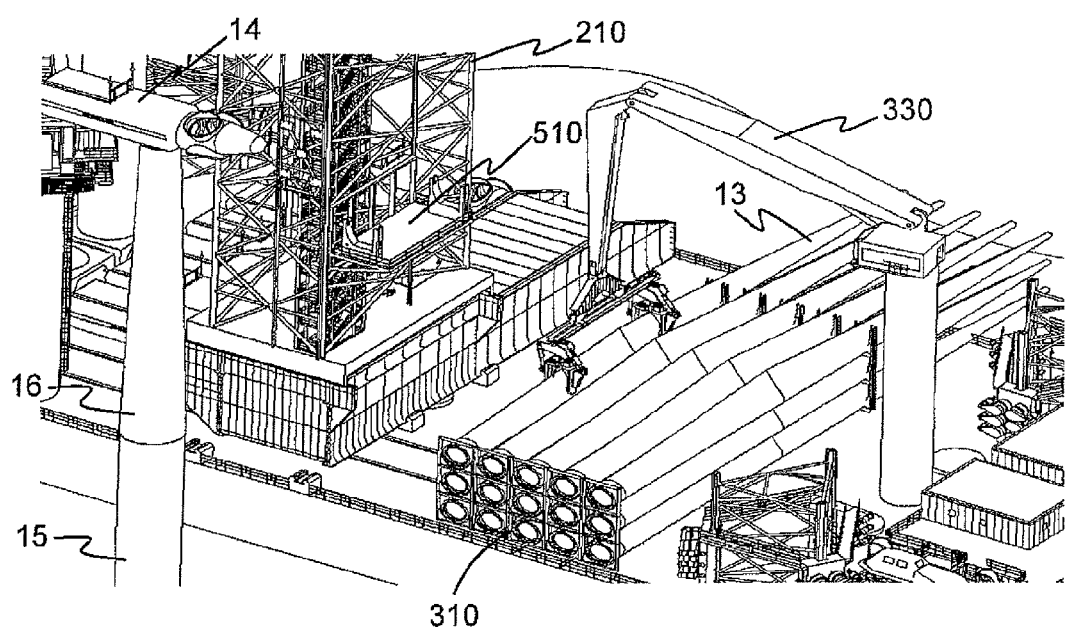
FIGS. 5A to 5D show a method for wind turbine installation at an offshore installation site according to one embodiment of the invention.
Figure 5B:
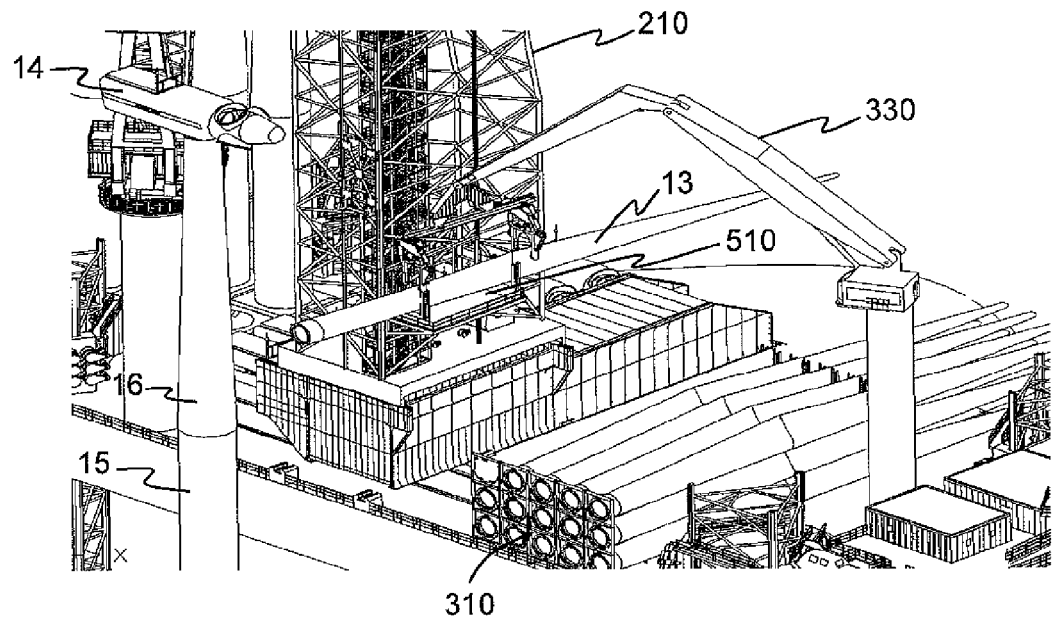
Figure 5C:
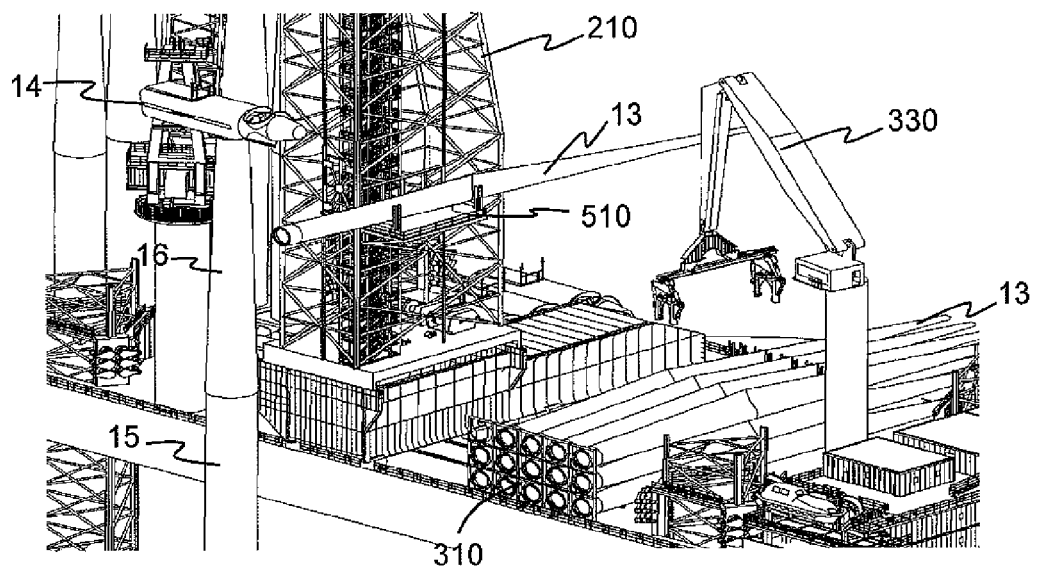
Figure 5D:
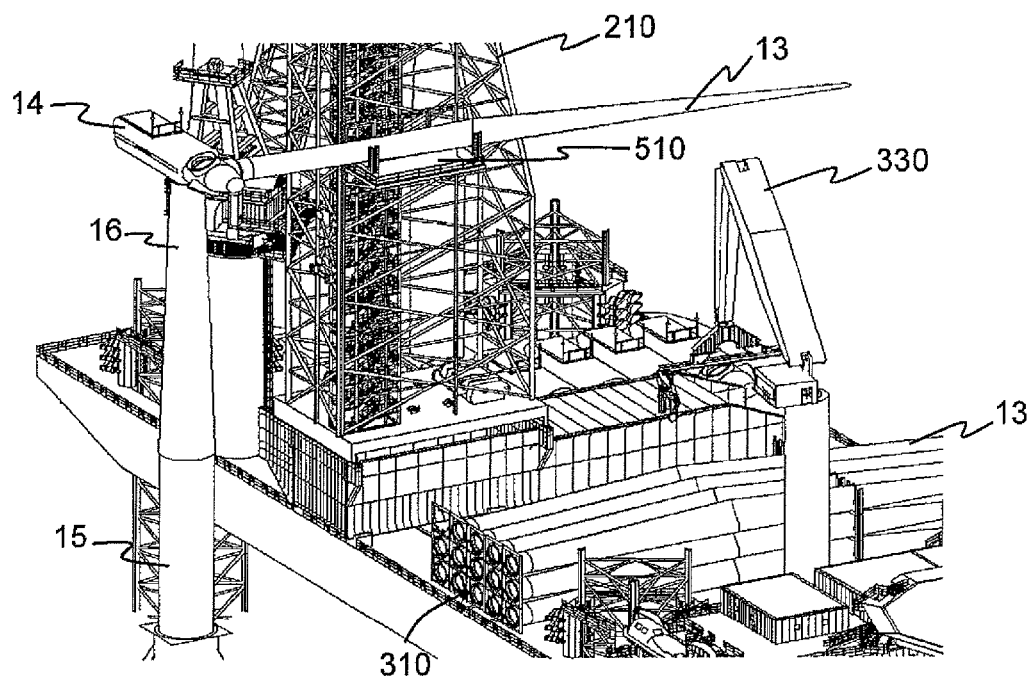

FIGS. 5A to 5D show another method for installing a wind turbine at an offshore installation site according to another embodiment of the invention where blades are installed directly to the hub which in turn have been installed on the tower sections in the foundation 17. To this purpose, tower sections, nacelle and hub of a wind turbine may be transferred by a main crane 320 or cantilever mast 200 from the installation vessel 300 to a foundation 17 at an offshore installation site. A blade handling crane 330 then picks up a blade 13 from a blade magazine 310 (FIG. 5A). The picked-up blade 13 is transferred onto an elevator 510 (FIG. 5B) to be lifted along the mast 210 to a desired height (FIG. 5C). The blade supported on the elevator 510 is transferred by the cantilever mast 200 to be installed to the hub. To this purpose, the cantilever mast 200 may be skidded or moved in the longitudinal and/or transverse direction to deliver the blade towards the nacelle. Further fine tuning of the cantilever mast 200 in the longitudinal and/or transverse direction may be performed to install the blade 13 into the hub 14 (FIG. 5D).

In this embodiment, an elevator 510 may be movably installed along the mast 210 by auxiliary winches to provide load lifting and transfer along the mast 210. Further, the method requires the hub to be rotated with one blade. It is envisioned that special hydraulic torque tools including removable hydraulic cylinders could be attached to the free shaft of the hub generator for hub rotation during the installation phase. This method may also require an additional dolly track to be installed on a side of the mast 210 where a gripper consisting of belt straps will enable the picked-up blade to be tilted, pivoted and twisted.

In certain situations where minimal offshore installation time is desired or personnel are limited, a wind turbine may be assembled onshore or in shallow waters at a harbour before being transported to the installation site. Hence, FIGS. 6A to 6D show a method for loading complete assembled wind turbines from a feeder vessel 410 onto the installation vessel 300.

Figure 6A:
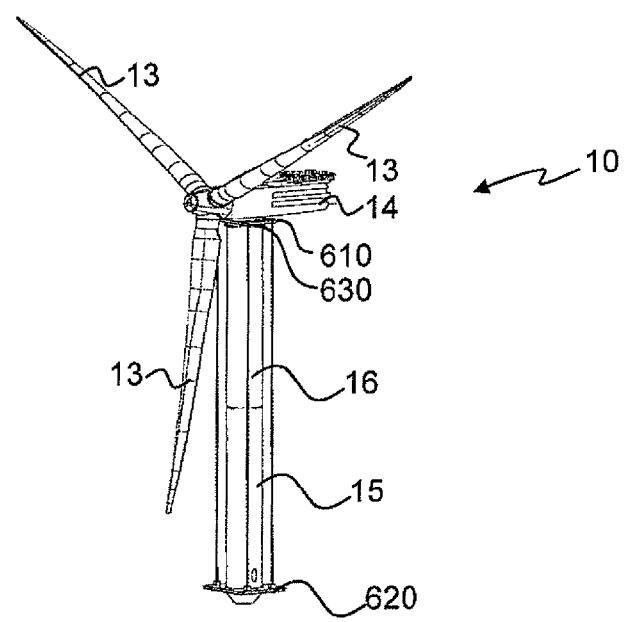
FIGS. 6A to 6D show a method for wind turbine installation at an offshore installation site according to one embodiment of the invention.

FIG. 6A shows a complete assembled wind turbine 10 with additional hoisting assembly to assist in offshore installation. The hoisting assembly includes a top piece 610 which is mounted below the nacelle and a bottom piece 620 which is mounted below the lower tower section 15. A spreader beam 630 surrounds the top piece to act as a full disc which would allow some tilting movement of the wind turbine 10. The disc is movable vertically along the tower section. The disc may have a rectangle shape or other suitable shapes with a centre opening. Each corner of the disc may be provided with a hoist wire which terminates into a lifting eye. The bottom piece 620 may have an inverted cone shape to reduce the forces transferred to the tower sections during lift off from the feeder vessel 410.

Figure 6B:
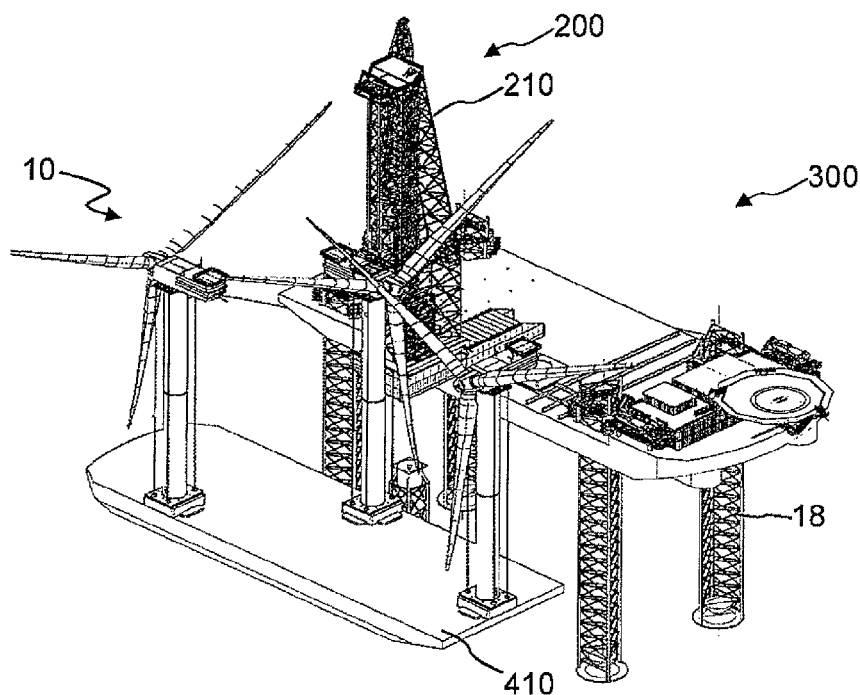
Figure 6C:
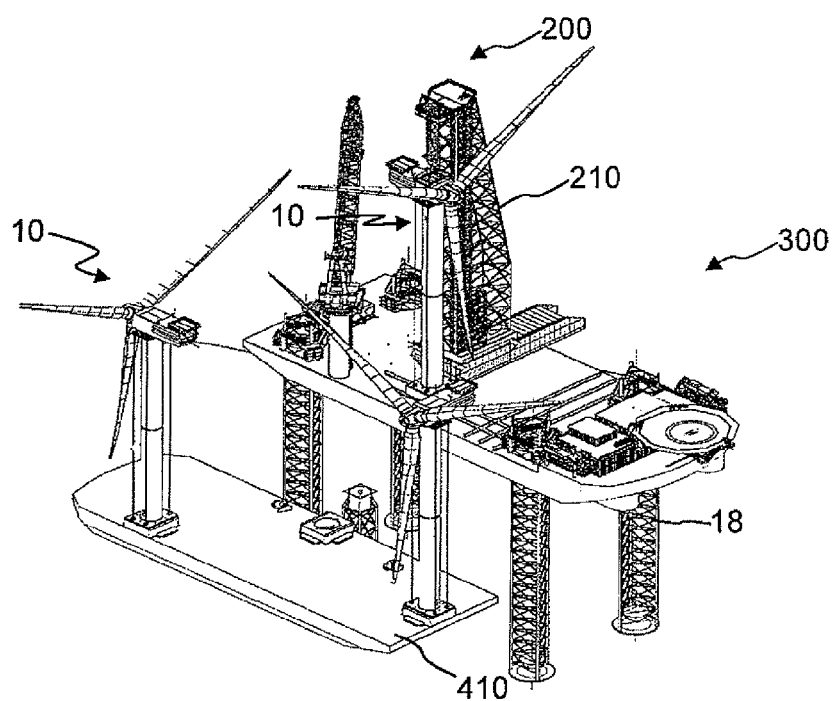

FIG. 6B shows a feeder vessel 410 transporting vertically oriented complete assembled wind turbines 10 to an offshore installation site, and positioning itself close to the foundation 17 in front of the installation vessel 300. The cantilever mast 200 is skidded or moved out in a longitudinal and/or transverse direction to pick up a complete assembled wind turbine 10 by use of an active heave winch on the mast 210, and transfer the complete assembled wind turbine 10 onto the installation vessel 300 (FIG. 6C). It may be necessary to suspend the complete assembled wind turbine 10 in a special removable hoist fixture which would allow the weight of the wind turbine 10 to be carried from the bottom while the wind turbine 10 is guided from the top. It may also be necessary to pre-install a transition piece to the bottom of the tower section of the wind turbine 10, and a top guide piece between the upper tower section and the nacelle. These transition pieces would support the weight and forces of the wind turbine 10 during the installation process.

Figure 6D:
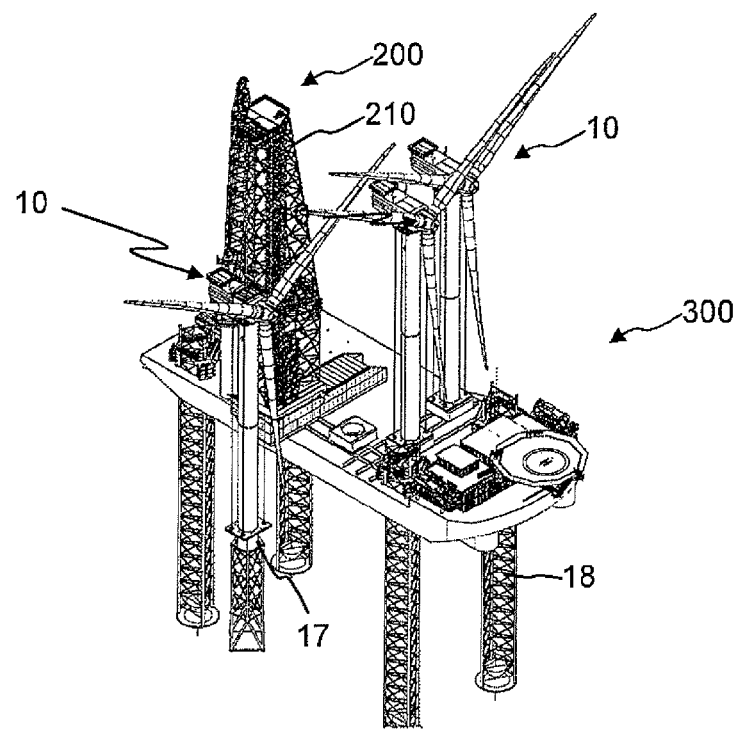

Multiple complete assembled wind turbines 10, e.g. three, may be transferred from the feeder vessel 410 onto the installation vessel 300 and stored vertically on nacelle skidding rails 302 (FIG. 6D). This enables the installation vessel 300 to install wind turbines onto multiple foundations 17 consecutively while the feeder vessel 410 shuttles back and forth to the port to pick new complete assembled wind turbines.

In the above methods, when the cantilever mast 200 transfers wind turbine components to an installation site, the wind turbine components being lifted by the mast 210 are secured to the moving lifting structure 216 which is guided by a travelling block dolly 218. Particularly, the travelling block dolly 218 is secured to the lifting structure 216 and is arranged to move along guide rails along the mast 210. Accordingly, the wind turbine components being lifted are movably engaged to the rail guides along the mast 210 and thereby prevented from swinging while being lifted or transferred.

Figure 7A:
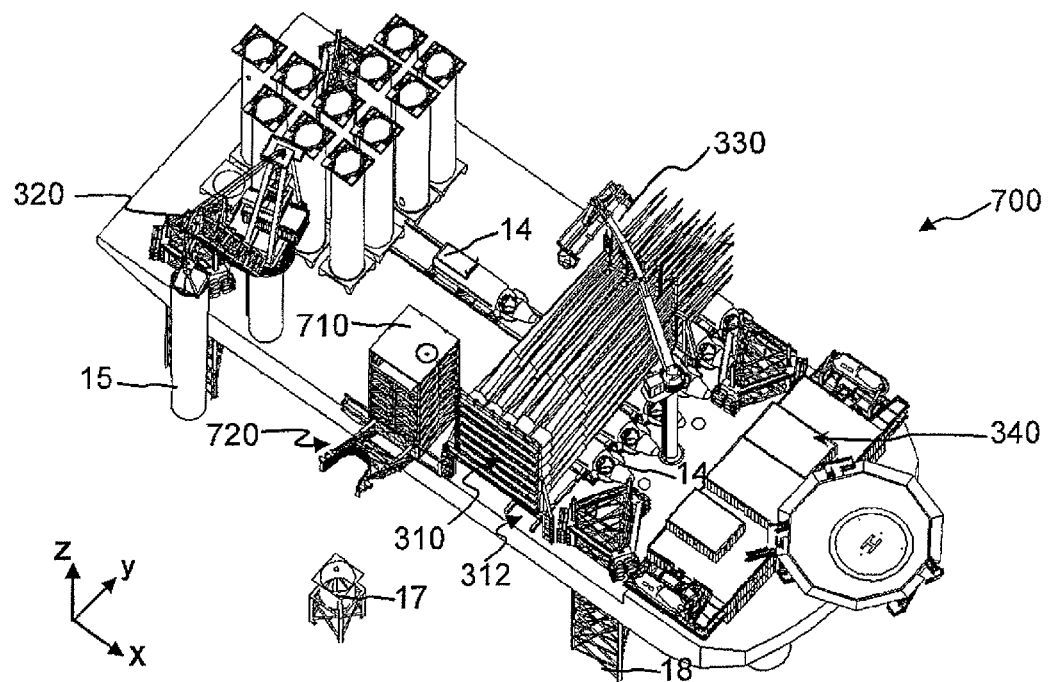
FIGS. 7A to 7D show a method for wind turbine installation at an offshore installation site according to one embodiment of the invention.
Figure 7B:
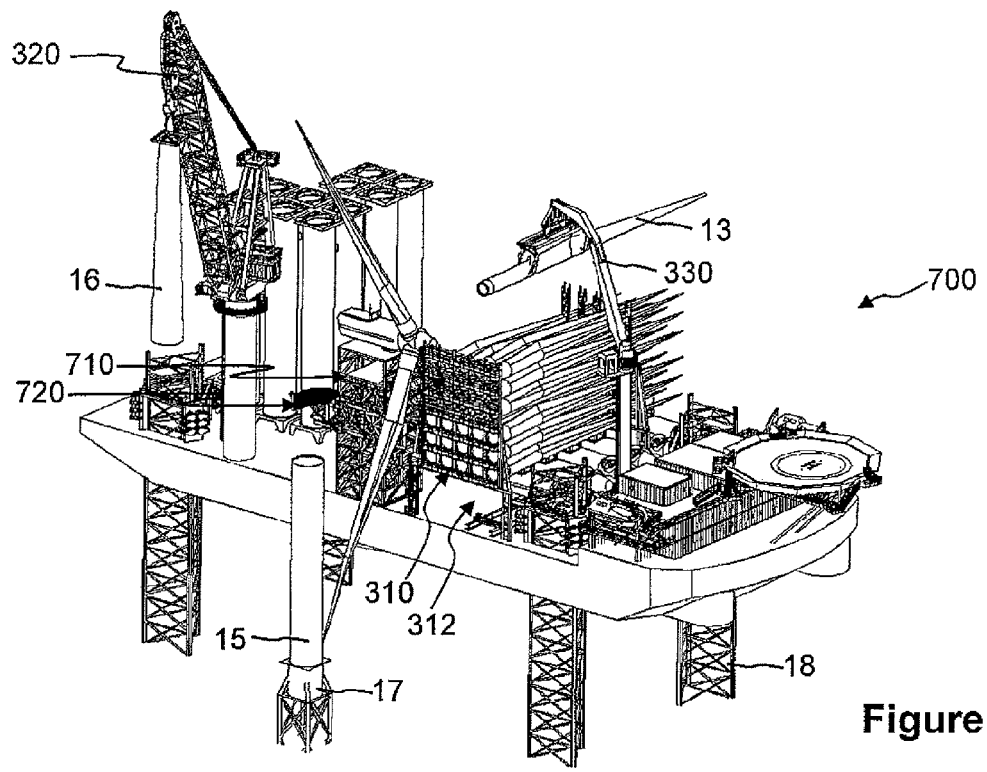
Figure 7C:
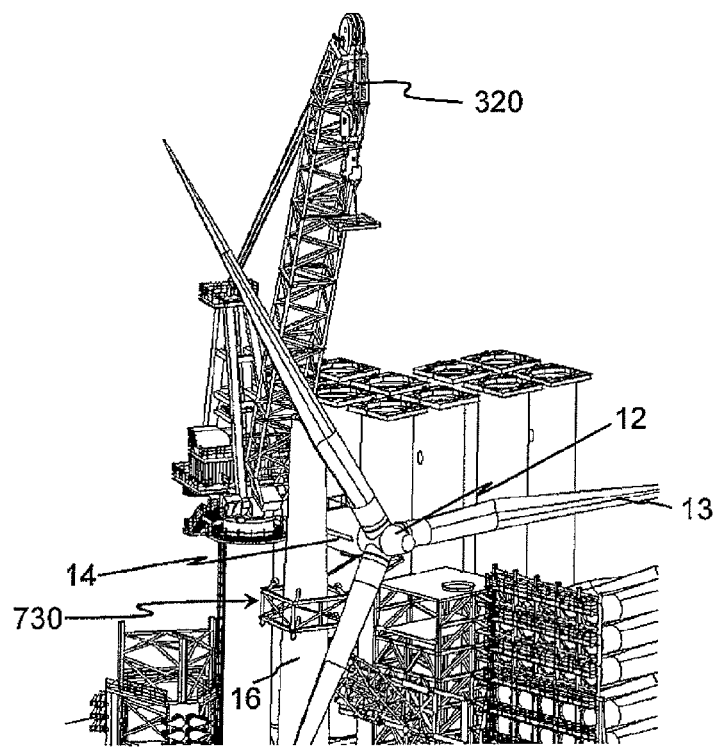
Figure 7D:
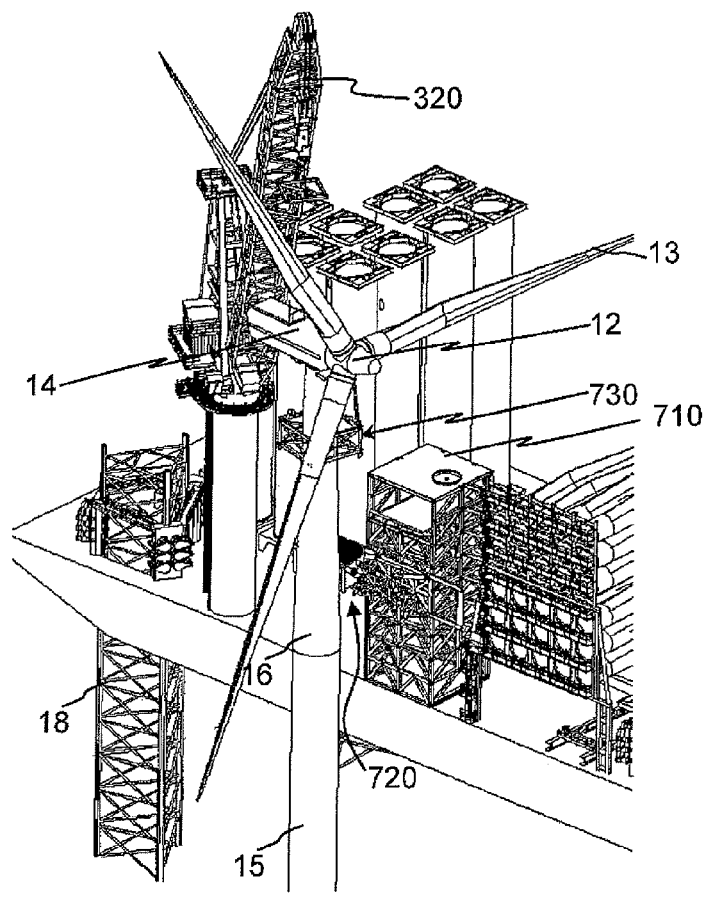

Reference is now made to FIGS. 7A to 7D illustrating another embodiment of the invention. FIG. 7A illustrates a layout of an installation vessel 700 similar to FIGS. 2A and 2C except for the following modifications. The installation vessel 700 provides an assembly platform 710 which is elevated from the deck, and a guide arm 720 adjustable in at least three directions and operable to cooperate with a main crane 320 during transfer of a wind turbine component between the deck and an offshore installation site. The assembly platform 710 may be movable in a longitudinal and/or transverse direction (x and y directions) such as by mounting on cantilever structure or platforms as described in the earlier paragraphs. This arrangement would allow the assembly platform 710 to move over the deck and even over the sea beyond the deck.

The guide arm 720 may be movably mounted to the assembly platform 710 or other structures on the deck. Particularly, one end of the guide arm 720 may be coupled to a trolley which is movable or adjustable in a vertical direction in order to move the guide arm 720 towards or away from the deck. The guide arm 720 may further be constructed and arranged such that the guide arm 720 or portions of the guide arm 720 may have multiple degrees of freedom of motion, i.e., a distal or free end of the guide arm 720 may be adjustable or movable in at least three translational directions, e.g. along x-axis, y-axis and z-axis, and in a pivotal direction, e.g. about x-axis. Additionally, the guide arm 720 or a C-shape frame attached thereto or both may be movable about the z-axis either independently or in synchronisation (see FIG. 7A for an illustration of various directions).

In operation, the guide arm 720 may cooperate with the main crane 320 to facilitate transfer of wind turbine components from the installation vessel 700 to an offshore installation site. More particularly, the free end of the guide arm 720 may be provided with a C-shaped attachment which may be operable to engage a portion of a tower section to guide the tower section to a desired position through translational manipulation in the directions along the x, y and/or z axes. This way, undesired swinging and/or tilting movements of the tower section caused by wind and/or wave conditions during transfer can be reduced, and thereby reducing installation time. It is to be appreciated that the C-shaped frame may be replaced by other suitably-shaped frame.

The assembly platform 710 provided on the deck may support a nacelle and hub while blades are being installed to the hub. The assembly platform 710 may be elevated from the deck such that there is sufficient room to rotate the hub during blade installation without risking an impact of the blades with the installation vessel or other structures on the installation vessel.

In one embodiment illustrated in the Figures, the assembly platform 710 is fixedly mounted to the deck. In another embodiment, the assembly platform 710 may be mounted on a skidable or movable platform which, in turn, may be mounted to the installation vessel or other structures. The skidable or movable platform may be movable along at least one direction, e.g. along x-axis or longitudinal direction, y-axis or transverse direction or both, so that the nacelle assembly may be moved towards the offshore installation site before being lifted and transferred by the main crane 320.

A blade handling crane 330, e.g. a knuckle boom crane or other suitable cranes, may be provided and suitably located relative to the assembly platform 710 and blade magazine 310. The main crane 320 may be provided with a gripper at a free end which may be manipulated to pick up a blade and to install the blade to the hub.

A method for installing a wind turbine at an offshore installation site, according to one embodiment of the invention, will now be described with reference to FIGS. 7A to 7D. The method includes providing or disposing at least one tower section, a nacelle, a hub, and a plurality of blades on the deck. The tower section(s) are then transferred from the installation vessel 700 to a foundation 17 on an offshore installation site. To this purpose, the method further includes lifting at least one tower section from a storage location on the barge, by using a main crane 320, and moving the tower section towards the offshore installation location (see FIG. 7B). When the tower section approaches a vicinity of the offshore installation site, the guide arm 720 may be pivotally manipulated to engage a portion of the tower section and guide the tower section towards the foundation 17 at the offshore installation site. More particularly, the guide arm 720 may be adjusted in various directions, e.g. along x, y and/or z axes, as and when required. After the tower section is guided to a desired position, the main crane 320 may lower the tower section to install the tower section into a foundation 17 at the offshore installation site. If multiple tower sections of the windmill are provided, the above-described transfer procedures may be repeated at this time or later.

The method then proceeds to assemble the nacelle, the hub and the blades on the installation vessel 700. To this purpose, a nacelle may be retrieved from the nacelle storage area 312 by moving or skidding a nacelle from a stored position to a pick-up position using the aforesaid nacelle skid system and rails 302. From the pick-up position, the main crane 320 may transfer the nacelle to the assembly platform 710 (see FIG. 7B). If the nacelle has been pre-installed with a hub, the method may proceed to install the blades to the hub. If the nacelle is not pre-installed with a hub, the method may proceed to install a hub to the nacelle before proceeding to install the blades to the hub.

To install the blades to the hub, a blade handling crane 330 may be operated to pick up a first blade and install the first blade to the hub. After the first blade is installed, the hub is rotated about 120 degrees to prepare for installation of a second blade. Similarly, the blade handling crane 330 picks up a second blade and installs the second blade to the hub. The hub is then further rotated about 120 degrees to prepare for installation of a third blade. The blade handling crane 330 picks up a third blade and install connects the third blade to the hub to form a nacelle and rotor assembly (see FIG. 7B).

After all required blades are connected to the hub, the nacelle and rotor assembly may be transferred to the offshore installation site. To this purpose, the main crane 320 may lift the nacelle assembly from the assembly platform 710. Tensioning wires may also be coupled to the nacelle assembly via sheaves provided on the guide arm 720 and appropriately tensioned to reduce undesired swinging and/or tilting movement of the nacelle assembly during transfer to the offshore installation site. The main crane 320 and guide arm 720 may be manipulated to position the nacelle and rotor assembly at a desired position, e.g. a tower trolley 730, before installing the nacelle and rotor assembly to the installed tower section.

Figure 7E:
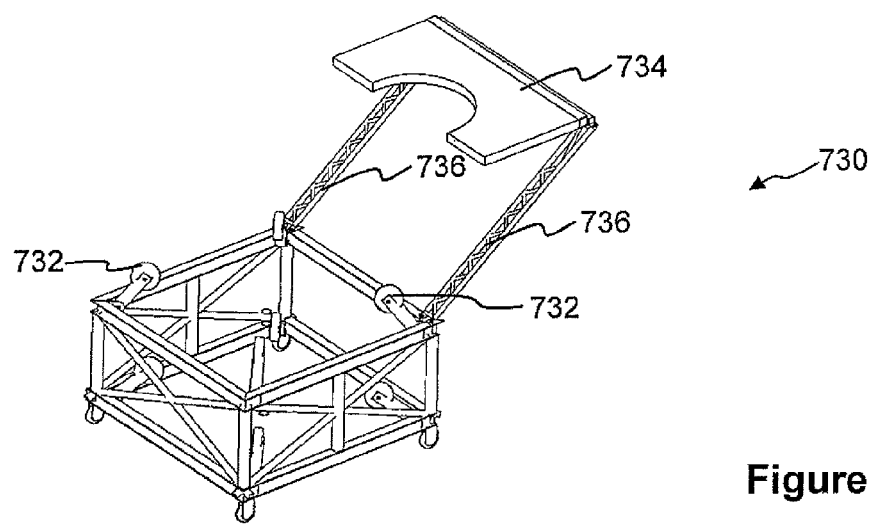
FIG. 7E shows a tower trolley that may be used in the embodiment of FIGS. 7A to 7D.

FIG. 7E shows a tower trolley 730 that is mounted on an installed tower section at the offshore installation site. The tower trolley 730 may have roller guides 732 arranged to move along the tower section. A support platform 734 may be movably attached to the tower trolley via one or more pivotable arms 736. The nacelle assembly may be placed on the support platform 734 of the tower trolley 730 which may then be moved towards the top of the tower sections to install the nacelle assembly on the installed tower section.

In the above paragraphs, installation of the tower sections at the offshore installation site and assembly of the nacelle, hub and blades are carried out in sequence. It is to be appreciated that these two aforesaid processes may be carried out at the same time.

Embodiments of the invention achieve various advantages including, but not limited to the following. Firstly, large and heavy weight cranes are not required which increase installation costs. Secondly, with the stacked arrangement of the nacelle storage area 312 and blades storage area, the deck of the installation vessel can be used more efficiently to house multiple wind turbine and their components. Thirdly, installation time is reduced by assembling the blades to the hub, while the blades, hub and nacelle are located within the installation vessel. This way, the assembling of the blades, hub and nacelle are less dependent on the weather or wind conditions and therefore reduces the installation time of the windmill. Fourthly, wind turbine components can be lifted and guided during transfer. This may be achieved by, for example, a dolly movably mounted on guide rails 220 along the mast 210 and secured to a load through a lifting structure which is secured to the load during load transfer, and cooperation of the main crane 320 and the guide arm 720 in FIGS. 7A-7D, thereby resulting in less downtime when installing a wind turbine under heavy wind conditions.

Other embodiments will be apparent to those skilled in the art from consideration of the specification and practice of the invention. Furthermore, certain terminology has been used for the purposes of descriptive clarity, and not to limit the embodiments as disclosed. The embodiments and features described above should be considered exemplary, with the invention being defined by the appended claims.

What is claimed is:

1. An offshore wind turbine installation method, comprising:
disposing an installation vessel proximate to an offshore installation site, the installation vessel comprising:
a deck;
a cantilever mast mounted on the deck, the cantilever mast including:
a cantilever structure movably mounted on the deck; and a mast mounted on the cantilever structure, the mast including a lifting structure operable to secure to a wind turbine component, a first guide, and an intermediate platform;
transferring at least one wind turbine component from the installation vessel to the offshore installation site, including:
securing the at least one wind turbine component to the lifting structure;
while movably engaging the lifting structure to the mast using the first guide to prevent swinging of the at least one wind turbine component, moving the cantilever mast in a longitudinal direction and a transverse direction to position the at least one wind turbine component at the offshore installation site spaced apart from the installation vessel; and
performing blade installation on a nacelle and a hub supported on the intermediate platform at an intermediate height along the mast to form a nacelle and rotor assembly.

2. The method of claim 1, wherein transferring at least one wind turbine component includes transferring the nacelle and rotor assembly, the method further comprising:
transferring a tower section from the installation vessel to the offshore installation site by using the main crane; and
at the same time, performing the blade installation.

3. The method of claim 1, wherein transferring at least one wind turbine component includes transferring the nacelle and rotor assembly, the method further comprising:
transferring a tower section to a pick-up position for lifting by the mast;
transferring the tower section to the offshore installation site, including lifting the tower section using the mast, and
while movably engaging the tower section to the mast using a second guide to prevent swinging of the tower section, moving the cantilever mast in a longitudinal direction and a transverse direction to position the tower section at the offshore installation site; and
thereafter, performing the blade installation.

4. The method of claim 1, wherein transferring at least one wind turbine component includes transferring the nacelle and rotor assembly, the method further comprising:
transferring the nacelle and rotor assembly from the installation vessel by moving the cantilever mast in a longitudinal direction and a transverse direction to lift the nacelle and rotor assembly from the intermediate platform; and transferring the nacelle and rotor assembly from the intermediate platform to the offshore installation site by using the main crane.

5. The method of claim 1, wherein transferring the at least one wind turbine component includes transferring the nacelle and rotor assembly to the offshore installation site, the method further comprising:

transferring a tower section and the nacelle and rotor assembly from the installation vessel to the offshore installation site using one of the main crane and the cantilever mast; and transferring the blade from a blade magazine to an elevator movably installed along the mast.

* * * * *